Oct. 8, 1968            R. ALBRECHT            3,404,905
SMOOTH PIPE CONNECTION ESPECIALLY FOR PIPES
OF SYNTHETIC MATERIAL
Filed July 11, 1966

3,404,905
SMOOTH PIPE CONNECTION ESPECIALLY FOR
PIPES OF SYNTHETIC MATERIAL
Robert Albrecht, Neuhausen am Rheinfall, Switzerland,
assignor to Georg Fischer Aktiengesellschaft, Schaffhausen, Switzerland
Filed July 11, 1966, Ser. No. 564,209
Claims priority, application Switzerland, July 15, 1965,
9,947/65
3 Claims. (Cl. 285—249)

ABSTRACT OF THE DISCLOSURE

A connection between a first and a second tubular member having overlapping portions spaced in radial direction with regard to each other and confining therebetween an outer and an inner wedge shaped member. The outer member is adapted to be engaged by an annular clamping element interposed between said first tubular member and a hollow nut surrounding said clamping element and threadedly engaging the second tubular member to exert axial pressure upon said outer wedge shaped member so as to cause the latter to wedge itself further between the inner wedge shaped member and the second tubular member whereby a radial pressure is conveyed through said inner wedge shaped member inwardly upon the first mentioned tubular member and by said outer wedge shaped member directly outwardly upon the second tubular member so as to establish a firm connection between said two tubular members.

---

The present invention relates to a smooth pipe connection, especially for pipes of synthetic material. Pipe connections of this type have been generally known. According to one group of these known pipe connections, there are provided conical clamping sleeves while the pipe is embraced from the outside only. Most pipe materials, however, have the tendency when subjected to a permanent load to "creep" and do so to an increased extent when under the influence of heat. The unilateral clamping from the outside at low inner pressure and without a supporting ring from the inside has a constricting effect upon the pipe. As a result thereof, the clamping tension decreases and the pipe slips out of its clamping means.

A second group of smooth pipe connections overcomes this drawback by providing means for embracing the pipe from both sides while supporting the pipe from the inside by means of a conical or cylindrical nipple. These supporting sleeves which consist mostly of a nonferrous metal have proved successful for water, gas, mineral oil, etc., but have failed for corrosive substances. For chemicals, food stuffs and aggressive water they are less suitable.

The heretofore known pipe connections of the type involved furthermore comprise a metallic housing and other metallic parts which come into contact with their surroundings, for instance with the soil, and are thus exposed to corrosion so that the great advantage inherent to the employment of synthetic pipes, their resistance to acids, lyes and salts at their connecting portions is lost.

The mere transfer of the shape and clamping elements of heretofore known metallic housings to housings of synthetic material has not proved successful because individual parts of the housing will deform readily when subjected to a pre-load.

It is, therefore, an object of the present invention to provide a smooth pipe connection, especially for pipes of synthetic material, which will overcome the above mentioned drawbacks.

It is another object of this invention to provide a connection as set forth in the preceding paragraph, which will be simple in manufacture and assembly.

These and other objects and advantages of the invention will appear more clearly from the following specification in connection with the accompanying drawing, in which:

FIG. 1 illustrates a section through a portion of the connection according to the present invention in non-clamped condition.

FIG. 2 shows a section similar to that of FIG. 1 but shows the connection in clamped condition.

The present invention which concerns a smooth pipe connection for pipes of synthetic material is characterized primarily in that the pipes or tubular members to be interconnected have overlapping portions in radially spaced relationship to each other while wedge-like ring members are interposed between said overlapping portions and are adapted in response to the tightening of a nut to be subjected to radial pressure in outward and inward direction whereby a firm connection between the two tubular members to be interconnected is effected.

Referring more specifically to the drawing, the connection illustrated therein shows a pipe end 1. The housing which establishes the connection to other pipe ends or portions of devices is designated with the reference numeral 2 and may form a part of a connecting member, a fitting, or the like. The connection furthermore comprises a box nut 3 which may be of any general type. The supporting sleeve 4 is driven into the pipe end 1 and may consist for instance of metal. For certain materials, as for instance bronze, the shape may also be somewhat slender and in this instance may have an angular profile. According to the drawing, the supporting sleeve 4 has a profile which is approximately that of a Venturi nozzle and consequently has only a low pressure drop. This shape of the supporting sleeve 4 is particularly suitable for a connection of synthetic material. The supporting sleeve 4 is intended to support the pipe end 1 in order to prevent a radial creeping or flowing or a constriction.

The special features of the present invention are seen in the combination of the outer clamping elements, i.e. an elastic sealing ring 5, a wedge ring 6 and an annular clamping element 7. The elastic sealing ring 5 has an approximately trapezoidal profile. This shape together with the wedge ring 6 will assure an elimination of the play without producing a preload. The angle of the wedge surface between the sealing ring 5 and the wedge ring 6 should be within the range of from 15 to 25°. Wedge ring 6 is connected to the annular clamping element or dish spring 7 by means of a ring gate 8 (Filmanguss), however, there also exists the possibility to cast the two parts 6 and 7 as separate parts. The hinge connection will, during the assembly, prevent an incorrect insertion of the two parts while still permitting a good movability of the annular clamping element. The annular clamping element 7 is tightened by tightening the box nut 3. FIG. 2 shows the entire connection in its effective or clamping condition. As will be seen from FIG. 2, the annular clamping element 7 has a non-connected portion of its back 9 in engagement with the wedge ring 6 and has its opposite surface in engagement with the box nut 3. In view of this clamping operation, the bore of the annular clamping element 7 is reduced so that the inner edge 10 presses into the pipe wall. In this way, the preload on the pipe end 1 is further improved. The point of attack of the nut with regard to the annular clamping element 7 is located on a favorable large radius. A particular feature of the present invention consists in that the wedge ring 6 and the annular clamping spring consist of acetal resin or of a reinforced synthetic resin, as for instance glass fibre reinforced acetal.

A connection according to the present invention has the following advantages. The annular clamping element can engage the box nut over a large radius. By engagement of the flat pressed annular clamping element with the wedge ring and with the box nut, a rise of torque is provided. The annular clamping element will assure a permanent resilient preload acting on the sealing ring so that also if certain housing portions should "creep," a permanent preload will be retained.

The individual force exerted by the box nut upon the annular clamping element will be effective over a line. The annular clamping element exerts a radial pressing action upon the outer wall of the pipe. In axial direction, the preload exerted by the nut is conveyed upon the wedge ring which in its turn acts in axial as well as in radial direction upon the conical sealing ring in such a way that the latter exerts both a sealing and a preloading effect upon the outer wall of the pipe. The preload of the seal can be limited within narrow tolerances by correspondingly dimensioning the annular clamping element so that also the stress to which the housing is exposed can be held low. A pipe coupling according to the present invention may be opened and again assembled as often as desired.

The pipe connection according to the present invention neither requires a heat treatment of the pipe nor are special tools required for pretreating the pipe end.

Most of the heretofore known pipe couplings are suitable only for soft polyethylenes, whereas the pipe connection according to the present invention is also suitable for hard synthetic pipes, made for instance of hard polyvinylchloride and other hard material.

It is, of course, to be understood that the present invention is, by no means, limited to the particular structure shown in the drawnig but also comprises any modifications within the scope of the appended claims.

What I claim is:

1. In combination: a first tubular member, a second tubular member having a portion thereof extending around a portion of said first tubular member in radially spaced relationship thereto so as to define therewith an annular chamber, supporting sleeve means having a portion thereof arranged within said portion of said first tubular member and having its outer peripheral surface provided with rib means firmly bearing against the inner peripheral surface of said first tubular member for supporting the same from the inside thereof, elastic sealing ring means mounted between the overlapping portions of said first and second tubular members in said annular chamber and having an outer peripheral surface portion tapering outwardly in a direction toward said second tubular member, wedge ring means interposed between said outer peripheral surface portion of said elastic sealing ring means and the adjacent inner surface of said second tubular member, the entire inner surface of said wedge ring which engages said outer tapered peripheral surface portion being tapered, hollow nut means surrounding said first tubular member and threadedly engaging the outer periphery of said second tubular member while defining chamber means with said two tubular members and with said wedge ring means and said sealing ring means, and elastic cone-shaped annular clamping means arranged within said chamber means and in non-loaded condition tapering inwardly in the direction toward said elastic sealing ring means, the inner portion of said clamping means engaging said elastic sealing ring means and the inner portion of said wedge ring means, said annular clamping means in response to tightening of said hollow nut means for establishing a tight connection between said tubular members assuming the shape of a substantially plane disc and pressing its inner periphery into the outer periphery of said first tubular member while simultaneously acting upon said wedge ring means so as to force the same between said second tubular member and said elastic ring means to thereby cause the latter to radially press said first tubular member against said supporting sleeve means.

2. An arrangement according to claim 1, in which said supporting sleeve means has a radially outwardly extending portion forming an abutment for the adjacent end face of said first tubular member and for engagement with said second tubular member.

3. An arrangement according to claim 1, in which said wedge ring means and said annular clamping means form a single integral cast piece.

References Cited

UNITED STATES PATENTS

| | | | |
|---|---|---|---|
| 2,021,745 | 11/1935 | Pfefferle et al. | 285—348 X |
| 2,230,115 | 1/1944 | Kreidel | 285—248 |
| 2,453,024 | 11/1948 | Lomelino | 285—383 X |
| 3,116,945 | 1/1964 | Blomquist et al. | 285—340 X |
| 3,140,107 | 7/1964 | Hynes | 285—340 |

FOREIGN PATENTS

| | | |
|---|---|---|
| 610,455 | 12/1960 | Canada. |
| 1,161,095 | 1/1964 | Germany. |
| 551,006 | 2/1943 | Great Britain. |
| 229,917 | 2/1944 | Switzerland. |

EDWARD C. ALLEN, *Primary Examiner.*

T. F. CALLAGHAN, *Assistant Examiner.*